Oct. 30, 1923.
W. HOLTORP
LUBRICATING DEVICE FOR AXLE JOURNALS
Filed May 22, 1922
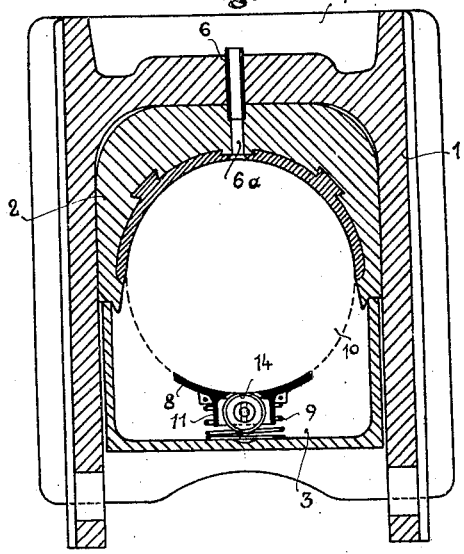
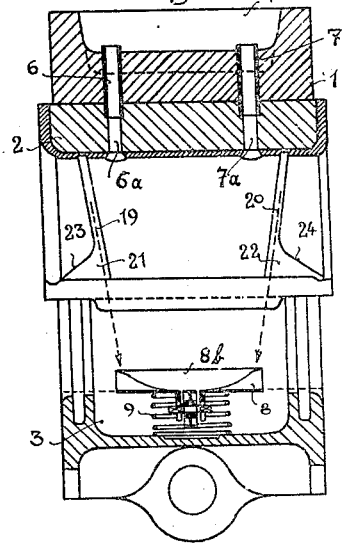
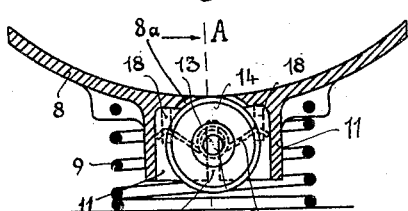
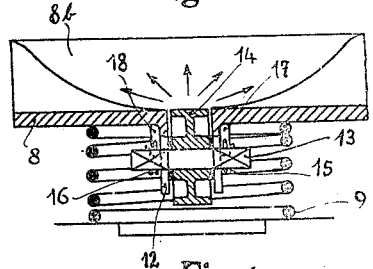
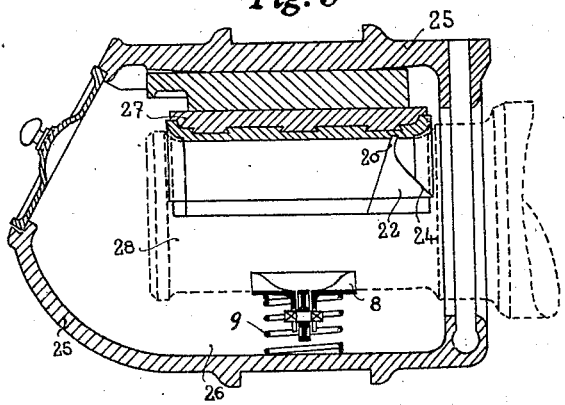
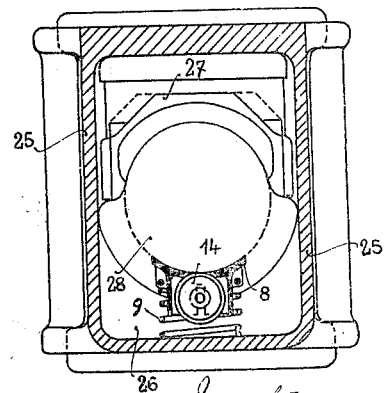
Inventor
Wilhelm Holtorp,
By [signature] Atty.

Patented Oct. 30, 1923.

1,472,363

UNITED STATES PATENT OFFICE.

WILHELM HOLTORP, OF HAMBURG, GERMANY.

LUBRICATING DEVICE FOR AXLE JOURNALS.

Application filed May 22, 1922. Serial No. 562,661.

*To all whom it may concern:*

Be it known that I, WILHELM HOLTORP, a citizen of the German Republic, and resident of Nr. 41 Wandsbeckerchausse, Hamburg, Germany, have invented certain new and useful Improvements in Lubricating Devices for Axle Journals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to boxes for axle-journals of locomotive-engines, railway- and tramway-cars and the like, and more particularly refers to improvements in lubricating devices provided in such boxes for lubricating the journal. The object of the improvements being to procure a lubricating device which is simple in construction and efficient in use, and which on the one hand ensures a thorough lubricating of the journal and on the other hand prevents any loss or waste of oil.

With the known journal-boxes a considerable loss or waste of oil is attributed to the tendency of the oil to travel to the hollow of the journal. By so doing the oil passes outwards through the axle hole in the journal-box and gets lost.

The present invention not only renders possible an abundant lubricating of the journal according to an oil circulating system by means of a lubricating shoe and a small oil supply or feeding roller, which are pressed against the journal, but also prevents at the same time a waste or loss of oil in the manner stated above, by providing in the brass of the journal an oil groove or oil grooves and a recess or recesses which check the lateral travelling of the oil in excess on the surface of the journal and direct the thereby retained oil again to the oil container or to the lubricating shoe. And with this end in view my invention consists in certain novel features of construction and combinations of parts as will be hereinafter fully described and pointed out in the claims with reference to the drawing in which:

Fig. 1 is a cross sectional and

Fig. 2 a longitudinal sectional elevation of a locomotive journal-box;

Fig. 3 is a longitudinal sectional elevation and

Fig. 4 an end view, partly in section, of an ordinary car journal-box;

Fig. 5 shows on a larger scale a vertical cross section and

Fig. 6 a vertical longitudinal section of the lubricating shoe on the line A—B of Fig. 5.

Similar numerals of reference refer to similar parts throughout the figures.

Referring to Figs. 1, 2, 5 and 6 there is arranged in well known manner in a frame-like box 1 a brass 2 and below the latter an oil container 3. At the upper end of the box 1 there is provided another oil container 4. This upper container is in communication through tubes 6 and 7 which register with bores $6^a$ and $7^a$ of the brass, with the inner surface of contact of the said brass.

Within the lower or main oil container 3 is arranged a lubricating shoe 8 having in its central part a perforation $8^a$ and being pressed against the lower side of the axle-journal 10 by a pressure spring 9. The shoe 8 has at its underside a box-like casting 11 the longitudinal walls of which are provided with slots 12 for the reception of the shaft 13 of an oil feeding or supply roller 14. As the ends of the shaft 13 engaging the slots 12 are leveled or squared, the said shaft is prevented from turning, but may move up and down to a certain degree in the said slots. The projecting ends of the shaft 13 are supported by means of springs 15 and 16, the ends of which are suspended from lugs 17, 18 on to the casting 11. The supporting springs 15 and 16 tend to press the supply roller 14 through the perforation $8^a$ against the journal 10.

The inner surface of contact of the brass 2 is furnished near its ends with grooves 19 and 20 directed toward the lubricating shoe 8, (see the dotted arrows in Fig. 2). The lower ends of these grooves have lateral recesses 21 22 respectively, each with an edge or border 23, 24 respectively, running obliquely upwards from without to the interior.

Referring to Figs. 3 and 4 showing a journal-box 25 for the journal 28 of a car-axle there is arranged in the said box a brass 27, whilst the lower part of the box is constructed to form an oil container 26. The lubricating shoe 8 is identical to that shown in Figs. 1, 2, 5 and 6 and is pressed against the journal 28 likewise by a pressure spring 9. The brass, however, has a somewhat modified form in that there is provided only at one end a groove 20 with a lateral recess 22 having an oblique or sloping bordering edge 24. At the other end of the brass such a contrivance is not needed, as here the oil can not get lost.

The function of the improved lubricating device is as follows:

When the axle-journal revolves the supply roller 14 being pressed with yielding pressure against the said journal, is rotated by the journal and supplies oil up from the oil container to the journal as indicated by the arrows in Fig. 6. The thus supplied oil distributes itself by means of the oil pocket 8ᵇ provided in the shoe 8, over the entire length of the journal. The oil in excess is skimmed or scraped off from the revolving journal by the edges or borders of the shoe contacting the surface of the journal (Fig. 5) and drops down into the lower oil container. By this means a continuous circulation of the oil is obtained and at all times an abundant oil supply up from the container to the journal ensured. The oil arriving near the ends of the brass and tending to drip out laterally, meets, or strikes against the edges 23 24 respectively of the brass and is forced by these edges, due to the revolution of the journal, into the grooves 19 and 20. These grooves give the oil streams, as is obvious from Fig. 2, such directions that on further revolution of the journal they will meet the scraping edges of the shoe 8. The parts of the brass outside the grooves 19 and 20 will nevertheless be oiled sufficiently, as the borders 23 and 24 do not scrape off the oil completely but only the oil in excess.

Besides the circulating lubrication pointed out above an additional fresh oil lubrication may be effected, if desired or required, from the upper oil container 5 (Figs. 1 and 2) through the tubes 6, 7 and bores 6ᵃ and 7ᵃ. This lubricating contrivance may also serve as an auxiliary or reserve-lubricator in case the oil supply roller 14 has got out of order or being broken down.

What I claim is—

1. In a car journal bearing, a brass having one or more outwardly directed oil grooves in the contacting face thereof and having at the ends an enlarged V-shaped portion extending from the lower end of the brass to the groove, the outer edges of said portions extending obliquely upward toward the groove and toward the middle of the brass to remove excess oil from the revolving journal and prevent the oil from going to the ends of the brass.

2. In a car journal bearing, a brass having one or more obliquely directed oil grooves extending circumferentially of the brass and having enlarged ends formed by an upwardly inclined edge extending from substantially the end of the brass to the groove, an oil distributor for contacting with the lower surface of the journal and to which said grooves are directed, whereby said distributer and grooves cooperate to remove surplus oil from the journal.

3. In a car journal bearing, a brass having a circumferential inclined groove in the bearing face thereof having enlarged ends formed by edges extending substantially from the end of the brass and oppositely inclined to the direction of the groove, thereby forming widened entrances, in combination with a shoe for contacting with the bottom of the journal, a roller mounted to supply oil to the shoe, said shoe operating to spread the oil from the roller over the extent of said shoe that is in contact with the journal, said groove having its one continuous wall directed toward said shoe the edge of which scrapes off the oil directed thereto.

4. In a car journal bearing, a brass having circumferential grooves diverging from one another at both ends from the edges of the brass and having their lower ends enlarged, one wall of each enlargement being continuous in direction with the groove to the brass edge and the other outer wall being sharply inclined thereto and directed upwardly from the edges of the brass toward the middle thereof.

In testimony that I claim the foregoing as my invention, I have signed my name

WILHELM HOLTORP.